United States Patent
White

(10) Patent No.: US 8,286,935 B2
(45) Date of Patent: Oct. 16, 2012

(54) SUBSEA ELECTRIC ACTUATOR USING LINEAR MOTOR

(75) Inventor: Paul W. White, Aberdeenshire (GB)

(73) Assignee: Vetco Gray Inc., Houston, TX (US)

( * ) Notice: Subject to any disclaimer, the term of this patent is extended or adjusted under 35 U.S.C. 154(b) by 558 days.

(21) Appl. No.: 12/473,889

(22) Filed: May 28, 2009

(65) Prior Publication Data

US 2009/0293957 A1 Dec. 3, 2009

Related U.S. Application Data

(60) Provisional application No. 61/056,680, filed on May 28, 2008.

(51) Int. Cl.
*F16K 31/08* (2006.01)
(52) U.S. Cl. .................. 251/65; 251/69; 251/129.01
(58) Field of Classification Search ............. 251/65, 251/129.01, 69; 310/12.01, 12.02, 12.15, 310/12.22, 12.27, 12.32, 13, 15, 17, 35
See application file for complete search history.

(56) References Cited

U.S. PATENT DOCUMENTS

| | | | |
|---|---|---|---|
| 4,528,466 A * | 7/1985 | von der Heide et al. | ... 310/12.27 |
| 4,635,901 A * | 1/1987 | Pond | ............... 137/554 |
| 4,771,982 A | 9/1988 | Bodine et al. | |
| 5,076,537 A | 12/1991 | Mears, Jr. | |
| 5,460,201 A | 10/1995 | Borcea et al. | |
| 5,831,353 A | 11/1998 | Bolding et al. | |
| 5,959,374 A * | 9/1999 | Anderson et al. | ............... 310/13 |
| 5,960,831 A | 10/1999 | Borcea et al. | |
| 6,206,038 B1 | 3/2001 | Klein et al. | |
| 6,257,549 B1 | 7/2001 | Hopper | |
| 6,585,228 B1 | 7/2003 | McCaskill | |
| 6,981,428 B2 | 1/2006 | Donald et al. | |
| 7,224,089 B2 * | 5/2007 | Morel | ......... 310/12.01 |
| 7,242,117 B2 * | 7/2007 | Sugita et al. | ........... 310/12.15 |
| 7,242,118 B2 * | 7/2007 | Sakamoto | .............. 310/15 |
| 7,845,925 B2 * | 12/2010 | Tooman et al. | ............ 425/146 |
| 2002/0124889 A1 | 9/2002 | Sundararajan | |

* cited by examiner

*Primary Examiner* — Eric Keasel
(74) *Attorney, Agent, or Firm* — Bracewell & Giuliani LLP

(57) ABSTRACT

An actuator for use with valves in a subsea wellhead assembly. The actuator includes a shaft with an alternating polarity along its length and windings spaced around the shaft that create a magnetic field around the shaft. The shaft is connectable to a valve stem so that flowing current through the windings creates a magnetic field for linearly moving the shaft and operating the valve. A fail safe mechanism can be included that pushes the shaft back to its original position thereby also moving the valve into its original, or fail safe, position.

12 Claims, 2 Drawing Sheets

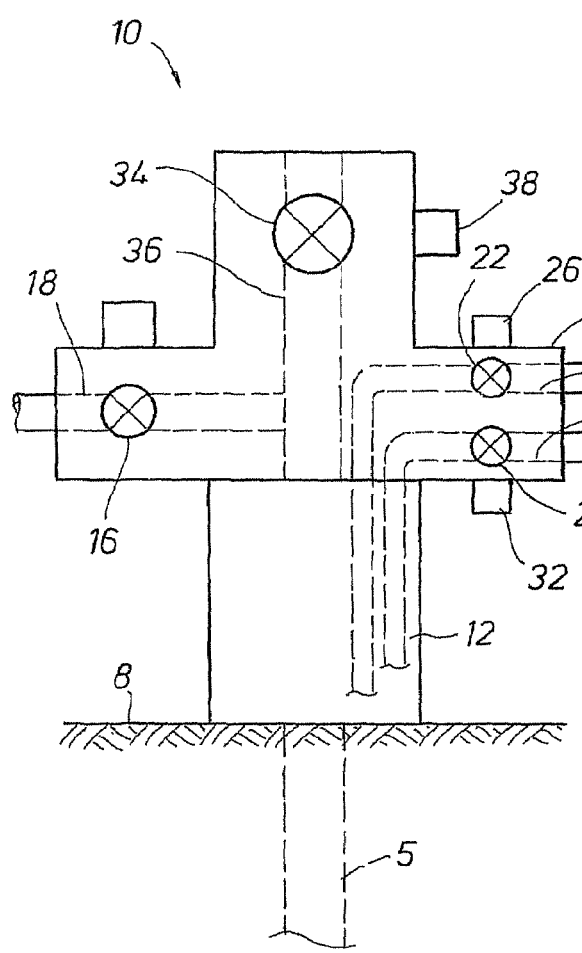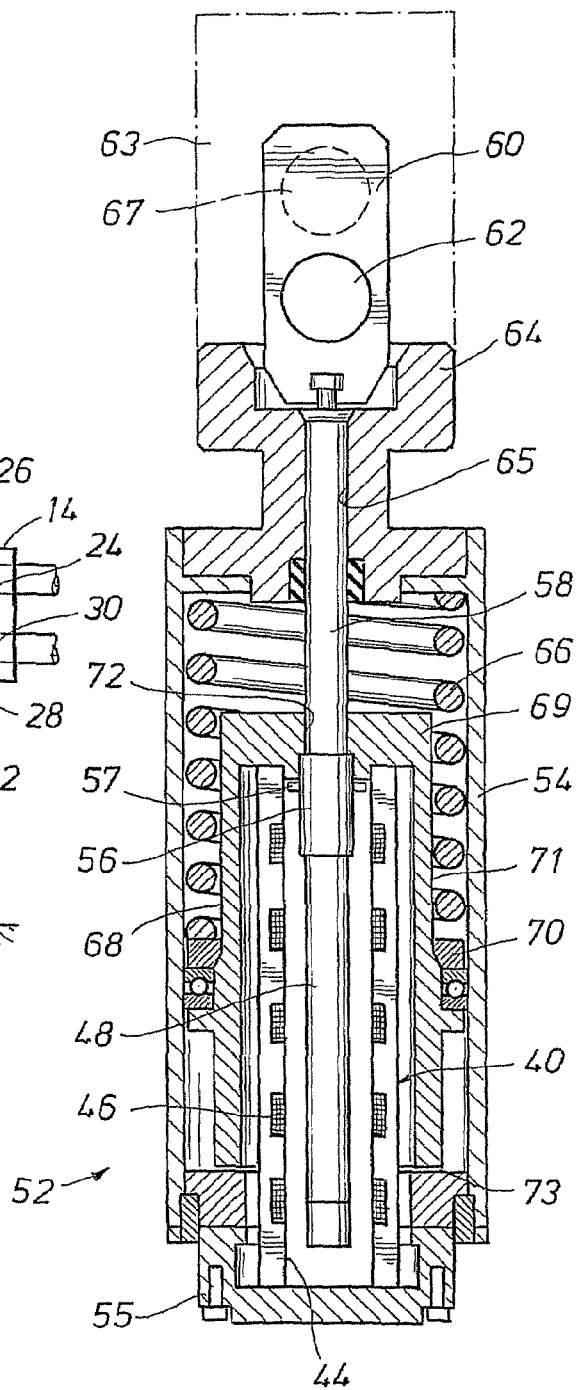

SUBSEA ELECTRIC ACTUATOR USING LINEAR MOTOR

CROSS REFERENCE TO RELATED APPLICATIONS

This application claims priority to and the benefit of U.S. Provisional Application Ser. No. 61/056,680, filed May 28, 2008, the full disclosure of which is hereby incorporated by reference herein.

FIELD OF INVENTION

This invention relates in general to production of oil and gas wells, and in particular to an actuator comprising a linear motor for use with a subsea wellhead.

DESCRIPTION OF RELATED ART

Systems for producing oil and gas from subsea wellbores typically include a subsea wellhead assembly that includes a wellhead housing attached at a wellbore opening, where the wellbore extends through one or more hydrocarbon producing formations. Casing and tubing hangers are landed within the housing for supporting casing and production tubing inserted into the wellbore. The casing lines the wellbore, thereby isolating the wellbore from the surrounding formation. Tubing typically lies concentric within the casing and provides a conduit for producing the hydrocarbons entrained within the formation.

Wellhead assemblies also typically include a production tree connecting to the upper end of the wellhead housing. The production tree controls and distributes the fluids produced from the wellbore. Valves assemblies are typically provided within wellhead production trees for controlling the flow of oil or gas from a wellhead and/or for controlling circulating fluid flow in and out of a wellhead. Gate valves and other sliding stem-type valves have a valve member or disc and operate by selectively moving the stem to insert/remove the valve member into/from the flow of fluid to stop/allow the flow when desired.

SUMMARY OF INVENTION

Disclosed herein is a valve for a subsea wellhead assembly that includes a valve body having a fluid flow passage, a gate selectively moveable to open and close the fluid flow passage, magnetized segments stacked together and coupled to the gate for movement therewith, and a winding array mounted proximate the magnetized segments, so that flowing electrical current through the winding array applies a magnetic field to linearly move the magnetized segments and cause the gate to move relative to the winding array. The winding array can include stator rods arranged around the magnetized segments, each stator rod having a winding. A multi-phase electrical supply can be included that is in communication with the winding of each stator rod, wherein adjacent windings the stator rods receive current at a different phase from each other. The phase of the current delivered to adjacent windings on the stator rods can vary by about 120°. A resilient member, such as a spring, can be engaged with the magnetized segments, so that movement of the magnetized segments from a first position compresses the resilient member and when the magnetic field is removed, the resilient member expands and moves the magnetized segments and gate back to the first position. The winding array can alternatively have a plurality of stator rods, each having a separate winding, the stator rods being spaced in a circular array around and parallel to the segments. The magnetized segments can be disk like members stacked together to form a shaft, and adjacent segments have opposite polarity.

Also disclosed herein is an actuator for use with a subsea valve. In one example, the actuator includes a valve having body, a passage in the body, and a gate that selectively is disposed into the passage. The actuator can be formed from a housing, an elongated shaft in the housing with magnetic segments along its length of alternating polarity, the shaft being non-rotatable relative to the housing and axially moveable relative to the housing, a winding array arranged around and spaced radially outward from the shaft, the winding array being fixed relative to the housing so that applying an alternating current to the winding array causes the shaft to move axially, and a coupling on the shaft that is attachable to the gate for moving the gate in unison with the shaft.

BRIEF DESCRIPTION OF THE DRAWINGS

FIG. 1 is a side view of a subsea production tree having a valve actuator in accordance with the present disclosure.

FIG. 3 is a side cutaway view of an example of the subsea actuators of FIG. 1 having a linear motor.

DETAILED DESCRIPTION OF THE INVENTION

Figure 2:
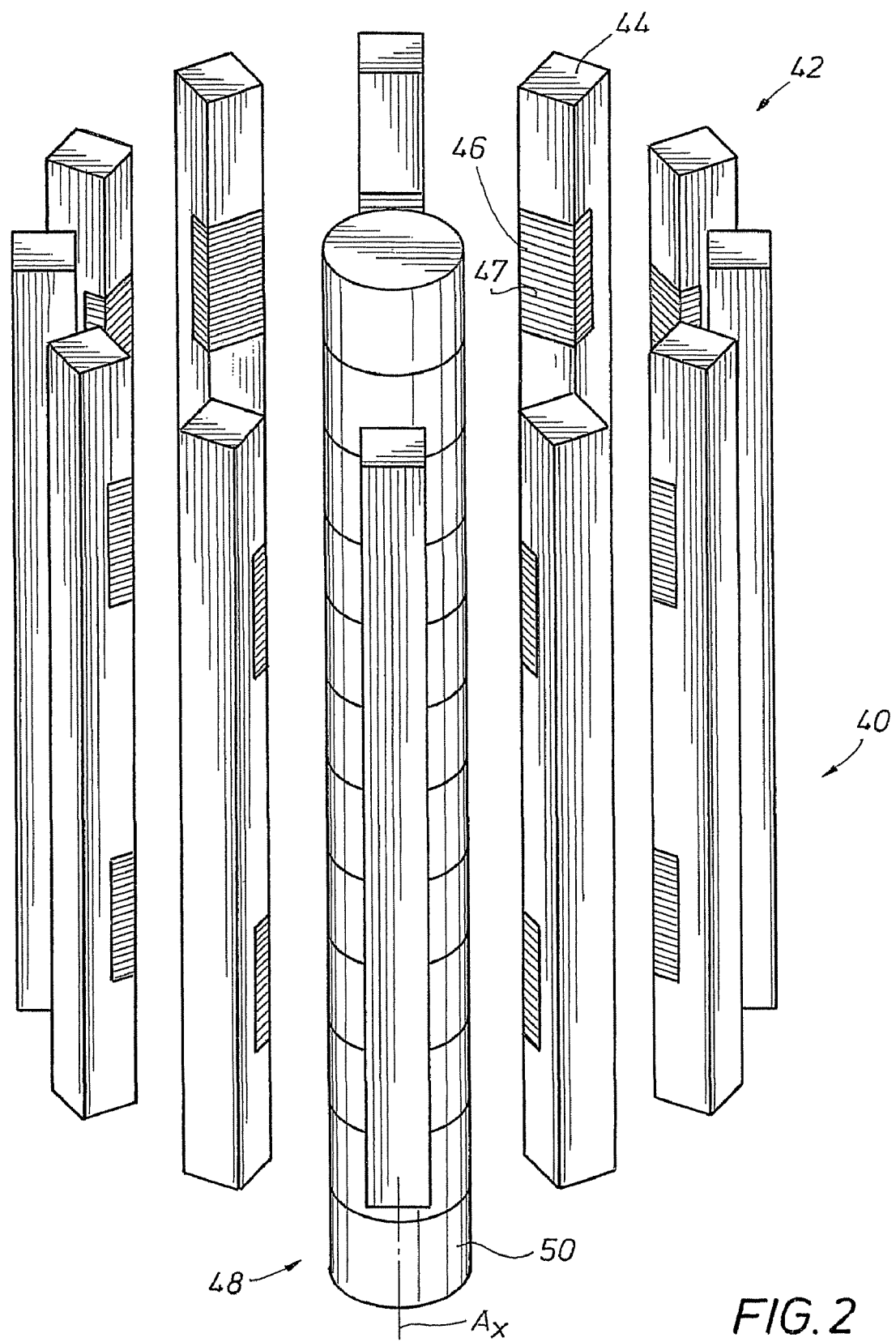
FIG. 2 is a perspective view of an example of a linear motor for use with the valve actuator of FIG. 1.

FIG. 1 is a side schematic view of a wellhead assembly 10 that includes a wellhead housing 12 seated on the seafloor 8 and connected to a hydrocarbon producing wellbore 5. Coupled on the upper end of the wellhead housing 12 is a production tree 14 having a tree bore 36 axially formed through the tree 14. The wellhead assembly 10 and production bore 5 can be accessed through the tree bore 36; such as for production, workover, fluid injection, or bypass operations. A production passage 18 is shown laterally extending from the tree bore 36 to outside the production tree 14. A wing valve 16 provided in the production passage 18 can be used to selectively regulate production fluid flow through the production passage 18. A wing valve actuator 20 is schematically illustrated and is coupled to the wing valve 16 for its selective operation.

Additional fluid flow paths are shown bored within the wellhead assembly 10 regulated with in line valves; in one example a fluid flow path is a bypass passage 24 illustrated in dashed outline in the wellhead assembly 10. The bypass passage 24 can provide fluid communication from the outside of the wellhead assembly 10 and into a tubing annulus (not shown) formed between production tubing and casing in the borehole 5. Flow through the bypass passage 24 can be regulated with an inline bypass valve 22 that in turn can be controlled with a bypass valve actuator 26 shown on the production tree 14 housing. Also shown in dashed outline in the wellhead assembly 10 is a workover passage 30 for conveying workover fluids to a portion of the wellbore 5 where workover operations are being undertaken. Fluid through the workover passage 30 is controlled with an inline workover valve 28 shown with an associated workover valve actuator 32 for powering the valve 28 open, closed, or in a throttling position. Thus workover and/or bypass operations through the wellhead assembly 10 can be performed by flowing fluid respectively through the bypass passage 24 and/or workover passage 30. A swab valve 34 is disposed within the tree bore 36, a swab valve actuator 38 attached to the housing bore for providing an opening and closing means for the swab valve 34.

An example of a linear motor 40 is shown in a perspective side view in FIG. 2. The linear motor 40 includes a stator array 42 that includes a series of stator rods 44 arranged parallel to each other in a generally circular pattern. A shaft 48 is disposed within the array 42 circle and oriented substantially parallel to the individual stator rods 44. The stator rods 44 include windings 46 disposed on the surface of the rods 44 facing the shaft 48. As shown in FIG. 2, the windings 46 include loops 47 of electrically conductive material lying in a plane substantially perpendicular to each rod 44. Each stator rod 44 can include multiple groups of windings 47. The windings 46 may each be connected to a three phase alternating current power source (not shown) where the three phases differ by 120°. Similarly, the power supplied to adjacent windings of the stator rods 44 may be sequentially 120° apart. In one embodiment, the number of stator rods 44 comprising the array 42 is a multiple of 3.

The shaft 48 is a cylindrical member comprising magnetized segments 50 stacked along a common axis, which also is the axis of stator array 42. The segments 50 may be made up of a permanent magnet or electromagnet, or can be temporarily magnetized. In the embodiment shown, each segment 50 has a polarity different than adjacent segments 50. Applying magnetic fields at strategic locations on the shaft 48 exerts a magnetic moment that can move the shaft 48 in a direction along its axis $A_X$. For example, flowing current through the coils or windings 46 of the array 42 as described above can form magnetic fields that act upon the segments 50 to move the shaft 48. The direction of shaft 48 movement depends on the direction of electrical current flow through the individual coils 46.

A side cross sectional view of an embodiment of an actuator 52 including a linear motor 40 is shown in FIG. 3. The actuator 52 includes an elongated and substantially hollow outer housing 54. An end cover 55 covers an end of the housing 54 and a valve bonnet 64 is seated in an end of the housing 54 opposite the end cover 55. A valve stem 58 is shown inserted through an axial bore 65 in the bonnet 64 and projecting into the housing 54, where a coupling 56 connects the valve stem 58 to the linear motor shaft 48. A valve gate 60, attached to the free end of the valve stem 58, an opening 62 formed through the gate 60. Shown in dashed outline is an example valve body 63 having an associated fluid flow passage 67 through the body 63. The valve actuator 52 can be used with any of the valves mentioned in FIG. 1 on the wellhead assembly 10. However use of the actuator 52 is not limited to the valves of FIG. 1 but can include any valve associated with subsea production or any valve located subsea.

As described above, energizing the coils 46 within the stator rods 44 linearly moves the shaft 48. When the linear motor 40 is coupled to a valve stem 65, the stem 65 moves with the shaft 48 to selectively open and/or close the associated valve (not shown). In one embodiment of use, selective passage or blockage of flow can be accomplished with the valve gate 60 by energizing the coils 46 to extend the shaft 48 from the linear motor 40. In the embodiment of FIG. 3, moving the shaft 48 outward in turn pushes the valve gate 60 from its bonnet 64, aligning the opening 62 with an the passage 67 to open the valve. Reversing current flow through the coils 46 pulls the shaft 48 and valve stem 58 in a direction towards the end cap 55 to position the valve gate 60 as shown in FIG. 3. Optionally, the opening 62 can be located on the far end of the gate 60 so that the valve is closed by pushing the valve stem 58 and opened by pulling the valve stem 58.

A fail safe plunger 68 is shown coaxially disposed within the housing 54 and circumscribing an end of the motor 40. In the example of FIG. 3, the plunger 68 includes a hollow cylindrical housing 71 with a flange 70 around its outer surface. The housing 71 is shown further having a closed end 69 and an open end 73. The plunger 68 is oriented so the closed end 69 is proximate to the valve bonnet 64 and the open end 73 is proximate the end cover 55. A bore 72 is provided in the closed end 69 to accommodate passage of the valve stem 58. A spring 66 is shown coaxial within the housing 54 and depending from an end adjacent the valve bonnet 64 into the annular space between the plunger housing 71. The coupling 56 includes a cross pin 57 shown engaging the closed end 69 so that the plunger 68 moves when the coupling 56 is moved towards the valve bonnet 64.

The radial flange 70 is dimensioned to contact and compress the spring 66 as it is moved towards the valve bonnet 64. If power is lost to the coils 46, potential energy stored in the compressed spring 66 moves the valve stem 58, aligning the valve gate 60 into a fail safe position. It should be pointed out however, that the actuator 52 can be configured such that energizing the motor 40 and extending the valve stem 58 produces selective blockage of a corresponding valve and wherein the retraction of the shaft 48 and the valve stem allows flow through the associated valve.

Optionally, the actuator 52 may be configured to fail open. This can be accomplished with the present spring 66 and flange 70 arrangement by reversing the opening 62 location on the valve gate 60 to its lower end. Alternatively, the actuator 52 is also configurable to remain "as is" upon a failure. The actuator 52 is usable with a subsea manifold, a vertical wellhead, a horizontal wellhead, and any other type of subsea application.

The present system and method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A valve for a subsea wellhead assembly comprising:
a valve body having a fluid flow passage;
a gate selectively moveable to open and close the fluid flow passage;
an actuator housing secured to the valve body, the actuator housing having an axis, a proximal end cap and a distal end cap with an axial bore extending therethrough;
an axially movable valve stem extending through the axial bore in the distal end cap, the valve stem having a proximal end within the housing and a distal end exterior of the housing and coupled to the gate for moving the gate;
a spring force transfer member carried within the housing, the transfer member having a cylindrical sidewall with a proximal end and a distal end, the distal end of the transfer member being mounted to the valve stem for movement in unison therewith, the cylindrical sidewall being spaced radially inward from the actuator housing, defining an annular space, the transfer member having external flange located within the annular space;
a coil spring within the housing, a portion the coil spring being in the annular space surrounding the cylindrical sidewall of the transfer member, the coil spring having a proximal end in cooperative engagement with the flange and a distal end in cooperative engagement with the distal end cap of the housing, so as to exert a force against the transfer member urging the proximal end of the transfer member toward she proximal end cap;

magnetized segments stacked together in alternating opposite polarity to define a magnetic segment shaft that is located in the force transfer member and coupled to the proximal end of the valve stem for movement therewith;

a linear motor winding array comprising a series of axially spaced apart windings each mounted proximate the magnetized segments, the array being located within the force transfer member surrounding the shaft, the array having a proximal end that is fixed to the housing; wherein energizing the array with electrical power, causes the shaft to move axially relative to the array, thereby causing the gate to move to the open position and causing the force transfer member to contract the coil spring; and wherein removing the electrical power from the array causes the coil spring extend to move the gate to the closed position.

2. The valve of claim 1, wherein the winding array further comprises stator rods spaced circumferentially apart from each other around the magnetic segment shaft, each of the stator rods having at least one of the windings.

3. The valve of claim 2, wherein each of the stator rods has a proximal end fixed to the end cap of the housing.

4. The valve of claim 3, wherein each of the stator rods has a distal end abutted by the distal end of the force transfer member when the gate is in the closed position, the distal end of the force transfer member being spaced axially from the distal ends of the stator rods while the gate is in the open position.

5. The valve of claim 1, wherein the flange of the force transfer member is located axially between the distal end and the proximal end of the force transfer member.

6. An actuator for use with a subsea valve having a body, a passage in the body, and a gate that selectively is disposed into the passage, the actuator comprising:

a housing;

an elongated shaft in the housing with magnetic segments along its length of alternating polarity, the shaft being non-rotatable relative to the housing and axially moveable relative to the housing from a retracted to an extended position;

a winding array comprising windings arranged around and spaced radially outward from the shaft within the housing at axially spaced apart locations and connectable to a source of electricity, the winding array being stationarily mounted in the housing for moving the shaft from the retracted to the extended position when supplied with electricity;

a stem located within and protruding from the housing for coupling to the gate;

a coupling on the shaft that is attachable to the stem for moving the gate in unison with the shaft;

a spring force transfer member within the housing and coupled to the valve stem for movement in unison with the shaft, the force transfer member having cylindrical sidewall that surrounds the winding array, the cylindrical sidewall being spaced radially inward from a sidewall of the housing, defining an annular space;

an external flange on the sidewall of force transfer member within the annular space; and a coil spr1ng having one end fixed to the housing and another end applying an axial force to the flange to urge the shaft to the retracted position.

7. The actuator of claim 6, wherein the winding array comprises elongated stator rods circumscribing the shaft, and each of the stator rods having at least one of the windings.

8. The actuator of claim 6, wherein the stator rods are parallel to the shaft and circumferentially spaced apart from each other.

9. The actuator of claim 8, wherein the gate is held in the open position solely by the electricity being supplied to the winding array.

10. The actuator of claim 6, wherein the force transfer member secures to the valve stem at the coupling.

11. A method of controlling flow through a wellhead assembly comprising:

providing a shaft assembly that has axially adjacent regions of alternating magnetic polarity and mounting the shaft assembly within an actuator housing for axial movement between contracted and extended positions relative to the housing;

mounting a linear motor winding array stationarily in the housing around the shaft assembly;

mounting a spring force transfer member within the housing for movement with the shaft assembly, the spring force member surrounding the winding array and having an external flange in an annular space between the transfer member and the housing;

mounting a coil spring in the housing with one end engaging the flange and an opposite end engaging the housing;

flowing an alternating electrical current through the winding array to move the shaft assembly from the contracted to the extended position and the gate linearly from a first position to a second position, the movement of the shaft assembly to the extended position contracting the coil spring; and moving the gate from the second position back to the first position by removing the alternating electrical current, which causes the coil spring to extend and move the shaft assembly back to the contracted position.

12. The method of claim 11, wherein the gate is held in the second position by maintaining the electrical current in the winding array.

* * * * *